March 16, 1954     R. H. FORGY     2,672,084
SUBSOILER
Filed Oct. 4, 1949     2 Sheets-Sheet 1
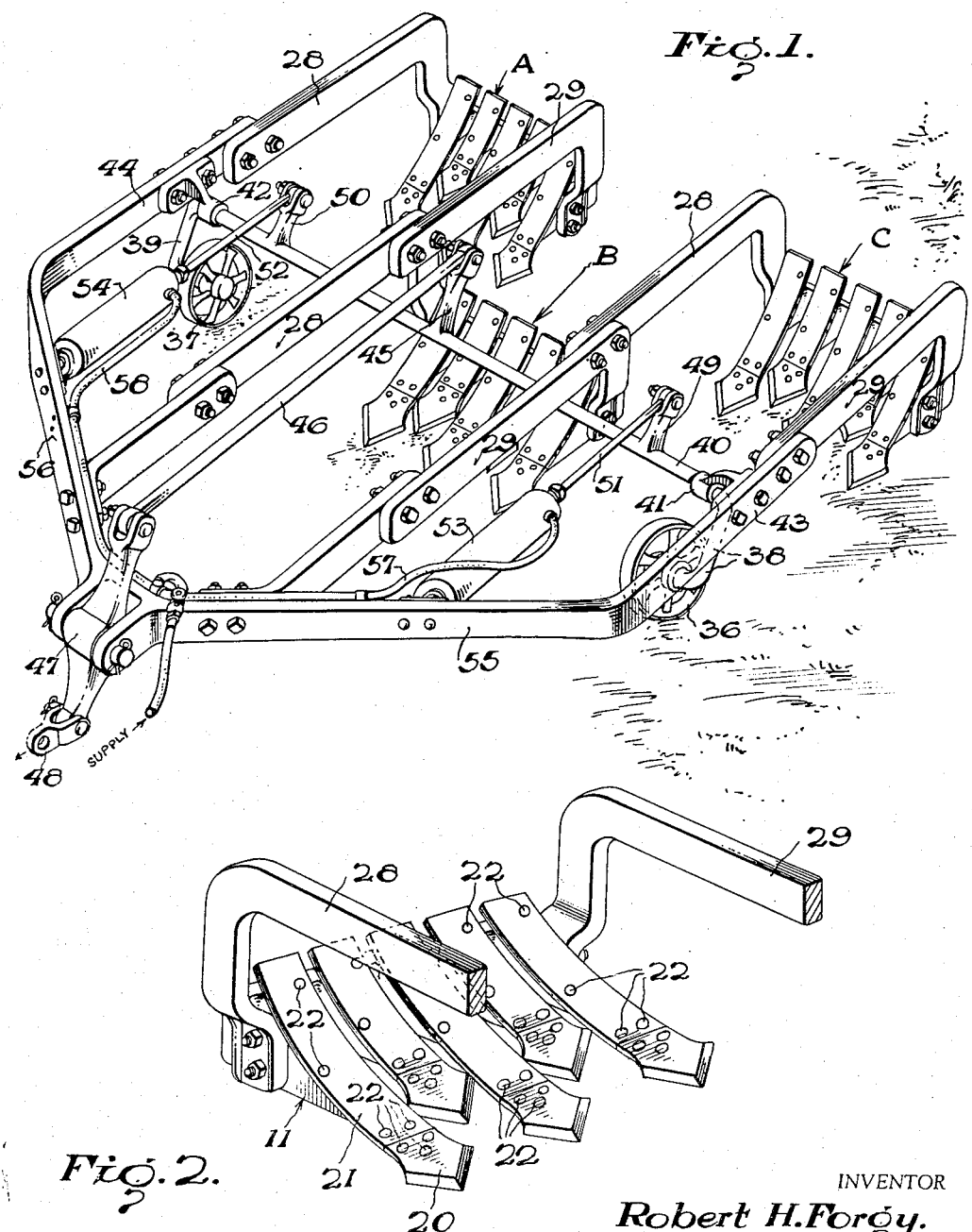
INVENTOR
Robert H. Forgy.
BY
ATTORNEY March 16, 1954
R. H. FORGY
2,672,084
SUBSOILER
Filed Oct. 4, 1949
2 Sheets-Sheet 2
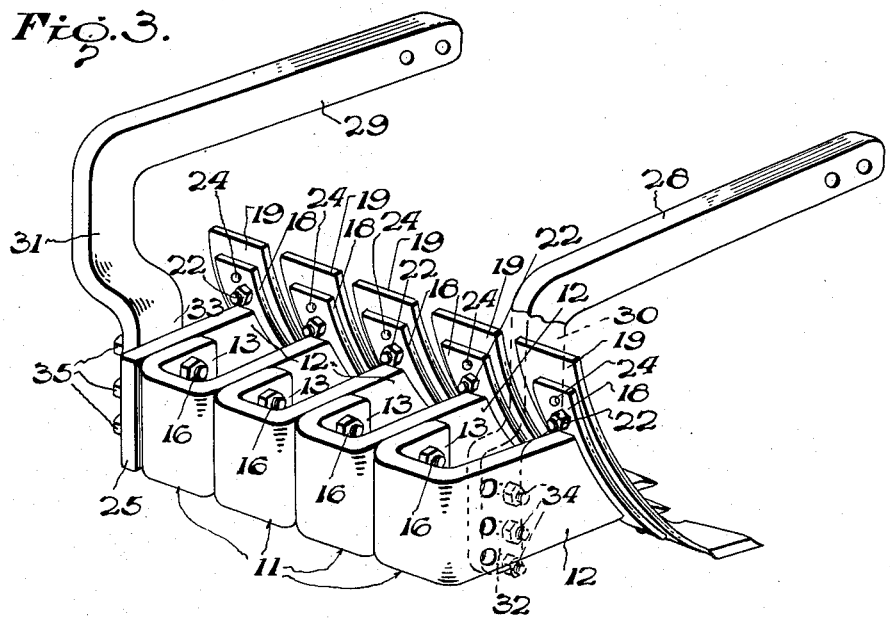
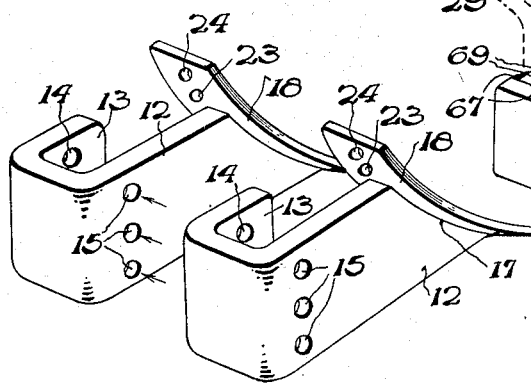
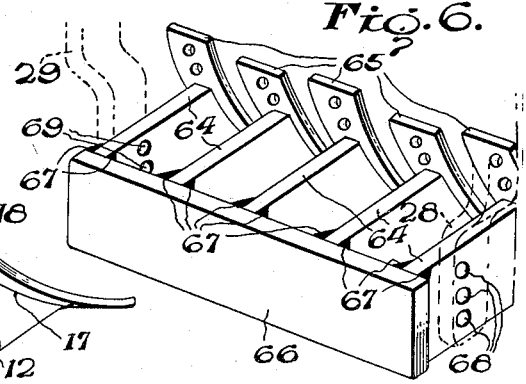
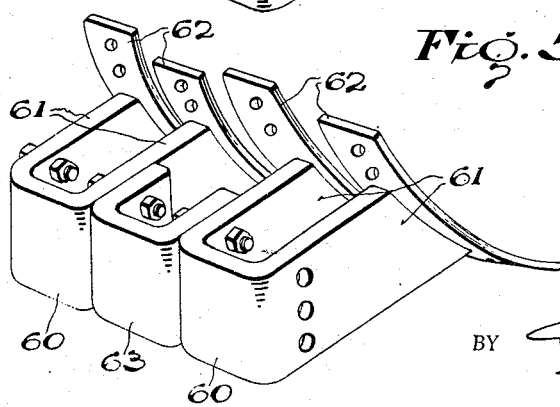
INVENTOR
Robert H. Forgy.
BY
ATTORNEY Patented Mar. 16, 1954

2,672,084

UNITED STATES PATENT OFFICE 2,672,084

SUBSOILER

Robert H. Forgy, Centralia, Kans.

Application October 4, 1949, Serial No. 119,441

1 Claim. (Cl. 97—78)

This invention relates to agricultural implements and is more particularly concerned with plows for breaking soil below the ground level. Such implements are usually referred to as subsoilers.

Ordinary plows operate generally to break the soil, lift it and then turn it over in forming furrows thereby burying the top soil and vegetation associated with it. Recent trends in farming practice indicates that it is more desirable not to plow under this part of the ground but instead to break the subsoil without materially disturbing the top soil and its vegetation from the standpoint of erosion control, irrigation and plant growth. That is to say, it is desirable to lift the top soil with the turf and then permit the same to fall back with the vegetation exposed thereon so that such vegetation and root systems form a natural mat or cover which acts as a protective cover against wind while at the same time permitting water to readily infiltrate and rendering subsequent earth preparing operations more effective than can be had with the usual plow.

One of the objects of this invention is the provision of a subsoiler which acts to cut the soil horizontally below ground level, elevate the soil out of the ground and then drop it back into place without materially disturbing the top soil and vegetation therein.

Another object of the invention is the provision of such a subsoiler which requires only a small amount of power to operate it.

A further object is to provide a subsoiler which includes substantially no obstructions to the soil as it is being elevated and dropped back into place.

A still further object is to provide a subsoiler which is simple in construction, inexpensive to assemble and which is readily attachable to a tractor or other draft means.

A still further object is the provision of a subsoiler comprising a plurality of similar units removably connected together in such a manner as to permit changing the width of the swath thereof.

Other objects include means for using different earth working tools, means for spacing the tools as desired, and means for shifting the position of the said tools, to change their angle of incidence with respect to the ground.

These and other objects and advantages of the invention will appear from the following description considered together with the accompanying drawing.

In the drawing:

Fig. 1 is an isometric view of a frame structure carrying a plurality of subsoiler assemblies in accordance with this invention.

Fig. 2 is an isometric view of one of the subsoiler assemblies apart from the frame structure.

Fig. 3 is another isometric view of the same unit as shown in Fig. 2 at a different angle.

Fig. 4 is an exploded view of a portion of the assembly illustrated in Figs. 2 and 3 showing the manner in which two of the basic units thereof are connected together.

Fig. 5 is an isometric view of a modified form of subsoiler assembly.

Fig. 6 is an isometric view of another modified form of subsoiler assembly.

Referring with more particularity to the drawing in which like numerals designate like parts, the embodiment illustrated in Figs. 1, 2, 3 and 4 comprises the subsoiler assembly which is constructed of a plurality of similar tool carrier units 11, each of said units comprising a strap member and being substantially J-shaped with one arm 12 longer than the other arm 13. As shown in the drawing, the arms 12 and 13 are parallel to and spaced from each other, being connected together by the intervening transverse bight portion at the rear. Said units are each provided with a plurality of apertures 14 on the shorter arm in alignment with apertures 15 on the longer arm to permit the units to be secured together by means of bolts 16 passing through the apertures. As many of these units as desired may be secured in this manner depending upon the width of the swath desired.

The front end of each long arm 12 is provided with a shoulder 17 sloping downward toward the front to which is secured by welding or other suitable means, a frog or support 18. Said frog or support is adapted to removably carry an earth working tool, such as a cutting blade 19. The cutting blade may be either in one part or in two parts. A two part blade may comprise a forward tip 20 (see Fig. 2) and a rearward shank 21 to permit replacing the tip when it becomes dull or broken or when a different shape is desired, such as flat, V-shaped, serrated, etc. The blades are attached to the frogs 18 by means of bolts 22 passing through apertures in the blade and apertures in the frog, such as the apertures 23. To provide for adjustment of the position of the blade on the frog additional apertures 24 may be provided through the frog adjacent the apertures 23 to be used alternativly thereof. In lieu of providing such additional apertures, slots (not shown) may be substituted for the apertures 23.

In assembling the carrier units, a long arm 12 will be on one side of the assembly and a short arm 13 will be on the opposite side. Accordingly, in order to complete the assembly, a special carrier unit consisting of a straight bar or extension arm 25 is secured to the outermost short arm 13, the front end of which is provided with a frog and earth working tool as in the case of the J-shaped units 11.

The assembly as a whole is supported on two parallel horizontal beams 28 and 29 which are spaced apart a distance corresponding to at least the swath of the completed assembly. Vertical portions 30 and 31 extend downwardly from one end of said beams and have their lower ends 32 and 33 inwardly offset to about the sides of the assembly to which they are secured by means of bolts 34 and 35. These bolts pass through apertures in the said lower ends 32 and 33 and corresponding apertures of the assembly, which may be the apertures 14 and 15, as shown. The lower ends 32 and 33 are below the level of the upper ends of the blades 17 so that earth moving over said blades will not come in contact with any part of the vertical portions 30 and 31.

The assemblies are mounted on a suitable frame structure which may be adapted to carry one, two, three or more of such assemblies. Fig. 1 illustrates three of these assemblies, designated generally by the letters A, B and C, respectively, connected together on a carriage supported on ground wheels 36 and 37. Said wheels are mounted on crank arms 38 and 39 respectively, of a shaft 40, which shaft is rotatably mounted in bearings 41 and 42 connected to frame members 43 and 44. In this manner, rotation of the shaft in one direction causes the frame to become elevated relative to the ground and in the other direction to become lowered relative to the ground. A lever arm 45 is secured to the middle of the shaft 40 and is connected by a link 46 to one end of a pivoted hitch bar 47 at the front of the carriage. The other end of the hitch bar is provided with a hitching device 48. It may be seen, therefore, that when a pull is exerted on the hitching device 48 the other end of the bar 47 is urged rearwardly. This movement is transmitted through the link 46 to the lever arm 45 and tends to rotate the shaft 40 clockwise, as viewed in Fig. 1. Rotation of the shaft in this direction causes the frame to become lowered. In order to control the movements of the shaft 40, it is provided with additional lever arms 49 and 50 which are connected to piston rods 51 and 52 of hydraulic cylinders 53 and 54 mounted on front frame members 55 and 56. Pipes 57 and 58 are connected to the rearward end of the cylinders 53 and 54 from a source of supply (not shown) of liquid, such as oil, under pressure with suitable valve means (not shown) for controlling the flow of liquid to and from the cylinders. Consequently, by forcing liquid into the cylinders through the pipes 57 and 58, the piston rods 51 and 52 are actuated to effect a rotation of the shaft 40 in a counterclockwise direction. Such control means are well known in the art and are given merely by way of example and not by way of limitation. Any other suitable means of controlling the vertical position of the frame may be employed such as depth gauges, lever controls with stops, and so forth.

In mounting the subsoiler assemblies on a frame structure of the type illustrated in Fig. 1 or of any other suitable type it is important to position it so that there are no obstructions to the passage of earth over the blades 19. Moreover, it is to be understood that although the beams 28 and 29 on which the assembly is mounted are shown in a position forward of the assembly to provide for pulling the unit through the ground, it is within the scope of this invention to reverse the position of the beams so that they extend rearwardly in cases where it may be desired to push the assemblies. For example, one of the uses to which such an assembly may be put is to break the soil in advance of an earth moving device, such as a scoop bucket. It is well known that such scoop buckets may operate satisfactorily in soft soil, but encounter difficulty in operating through hard soil. One of the assemblies of the present invention may be pivotally mounted on frame members to permit it to be lowered in operative position in front of such a scoop bucket whenever hard ground is encountered and out of operative position when the nature of the ground is such that it is not needed.

The modified form illustrated in Fig. 5 comprises a plurality of tool carrier units 60 similar to units 11, except that both arms 61 thereof are of the same length and each arm is provided with a frog 62 for carrying the earth working tools. In assemblying the units, spacers 63 are disposed between consecutive units and bolted thereto as in the previous embodiment. There is also illustrated in this figure the modification of using varying lengths of frogs to receive varying lengths of blades. This feature assists the breaking up of the soil as it glides over the rear ends of the blades and is generally applicable to all embodiments of the invention.

The further modification illustrated in Fig. 6 may be employed when a fixed width of swath is desired and there is no need to provide for any variation thereof. In this modification, a plurality of parallel arms 64 carry the frogs 65 at their front ends while the rear ends thereof are secured to a back plate or bar 66 by welds 67 or any other suitable means. Apertures 68 and 69 are provided in the outermost members 64 for attachment to supporting beams such as those illustrated in Fig. 3.

I claim:

A subsoiler assembly comprising a row of similar J-shaped strap members, said strap members being disposed in side by side relation, each member having a long arm and a short arm parallel to the long arm, the arms of each member being spaced apart and connected together by a transverse bight portion at the rear, said arms having aligned apertures, securing bolts in said apertures to connect the long arm of each member directly to the short arm of its adjacent member in the row, one terminal member of the row having its short arm on the outside, an extension arm secured to said short arm of said terminal member, the long arm of each member and said extension arm having their forward ends sloping downwardly and forwardly, a tool supportable frog on the sloping forward ends of the long arm of each member and of the extension arm, and means for attaching an earth working tool to each frog.

ROBERT H. FORGY.

References Cited in the file of this patent
UNITED STATES PATENTS

| Number | Name | Date |
|---|---|---|
| 6,503 | Bacon | June 5, 1849 |
| 448,740 | Mitchell et al. | Mar. 24, 1891 |
| 473,517 | Mitchell et al. | Apr. 26, 1892 |
| 674,405 | Greathouse | May 21, 1901 |
| 695,078 | Perkins | Mar. 11, 1902 |
| 902,075 | Hamilton | Oct. 27, 1908 |
| 1,130,655 | Andrew et al. | Mar. 2, 1915 |
| 1,642,301 | Forgy | Sept. 13, 1927 |
| 2,296,605 | Forgy | Sept. 22, 1942 |